United States Patent Office 2,853,492
Patented Sept. 23, 1958

2,853,492

PROCESS FOR THE MANUFACTURE OF ANTHRA-QUINONE VAT DYESTUFFS

Maurice Grelat, Basel, Walter Fioroni, Binningen, and Walter Kern, Sissach, Switzerland, assignors to Ciba Limited, Basel, Switzerland, a Swiss firm No Drawing. Application May 13, 1957
Serial No. 658,524

Claims priority, application Switzerland February 19, 1953

4 Claims. (Cl. 260—316)

This is a continuation-in-part of our copending application Ser. No. 410,464, filed February 15, 1954.

U. S. Patent No. 2,702,294 describes a process for the production of gray vat dyestuffs by carbazolizing the linear tetranthrimide, that is the tetranthrimide wherein each of the anthrimide bonds occupy the 1:4-position relatively to one another, with aluminum chloride in a pyridine base. The so-obtained dyestuffs give violet gray dyeings having excellent fastness to light, washing, alkali and chlorine. However, these dyestuffs have the disadvantage of not being fast to chlorite bleaching and of not dyeing fibers of different kinds, for example fibers of natural cellulose and regenerated cellulose, in the same shades. Such behaviour is not uncommon in the case of vat dyestuffs, and in many other vat dyestuffs presenting similar drawbacks it is an inherent property of the dyestuff molecule to be unfast to chlorite bleaching and to produce different shades on regenerated cellulose and on cotton.

However, in the present instance it was discovered by means of a special chromatographic technique on paper with the exclusion of the disturbing influence of air on the vat that according to this known process a mixture of about equal parts of two different dyestuffs is obtained.

The present invention is based on the observation that a uniform gray vat dyestuff is obtained which dyes natural and regenerated cellulose fibers the same shades having excellent fastness to chlorite when, instead of the linear tetranthrimide, a tetranthrimide is used as starting material and is subjected to a carbazolizing treatment in which the middle —NH— bridge is already part of a carbazole ring.

The present invention is based, therefore, on the one hand on the discovery that linear tetranthrimides present great difficulties as regards a complete carbazolization, and on the other hand on a teaching as to how these difficulties can be successfully overcome.

Similar difficulties were completely unknown in vat dyestuff chemistry and in previous carbazolizing reactions. Thus, not only trianthrimides, but also a great many polyanthrimides were hitherto carbazolized with complete success in one straight carbazolizing operation. Apart from the fact that the idea does not normally occur to a chemist to carry out one and the same reaction in two stages that can be effected in one stage, there was no hint to be found in the prior art to indicate any advantage of the present process. However, the surprising success of this invention, which more than outweighs its procedural complications, seems to indicate that in the one stage carbazolization of linear tetranthrimides the two carbazole rings between the first and second and between the third and fourth anthraquinone nuclei are formed first, and that after this reaction has taken place the central carbazole ring (between the second and the third nuclei) is formed only with great difficulty and not in a reliable manner. As a matter of fact, this reaction step, which surprisingly proves to be very difficult in a one stage carbazolization of a linear tetranthrimide, is very easy if carried out in an intermediate product, such as in a 4,4'-diacylamino-1,1'-dianthrimide in which the carbazolization takes place with sulfuric acid in the cold. After splitting the benzoyl groups, the tetranthrimide monocarbazole is formed by condensation with 2 mol of 1-chloro- or 1-chloro-4-benzoylaminoanthraquinone in which only the two end —NH— bridges, which can apparently be more easily carbazolized, still have to be carbazolized.

The 4,4'-diamino-1,1'-dianthrimide-2,2'-carbazole used as starting material for the present process is a known compound and may be obtained by known methods, for example most conveniently as described in U. S. Patent No. 1,840,383 by hydrolysing 4,4'-dibenzoylamino-1,1'-dianthrimide carbazole with dilute sulfuric acid.

The condensation of the said 4,4'-diamino-1,1'-dianthrimide carbazole with the 1-chloro-anthraquinone or 1-chloro-4-benzoylamino-anthraquinone is preferably carried out in an inert solvent such as nitrobenzene or naphthalene advantageously in the presence of an acid-binding agent, for example an alkali acetate or carbonate, and a catalytical amount of copper or a copper compound, such as copper acetate, -chloride, -carbonate or -oxide. The reaction is preferably carried out at an elevated temperature, for example at the boiling point of the solvent.

As carbazolizing agents for use in the present process there may be used more especially, the various known combinations of aluminum chloride with fluxing agents, it being uncertain in some cases how far these fluxing agents form molecular compounds with aluminum chloride. As such fluxing agents there may be mentioned aromatic compounds such as nitrobenzene, inorganic compounds such as sodium chloride or sulfur dioxide, either alone or in admixture with one another. The proportion of aluminum chloride to tetranthrimide carbazole may vary within wide limits. However it is advantageous to use at least 1–1.5 parts of aluminum chloride for 1 part of tetranthrimide mono carbazole. If the proportion of aluminum chloride to tetranthrimide mono carbazole is at least 2:1, especially good results are obtained. Advantageous results are generally obtained by using aluminum chloride with the addition of a tertiary base, for example, a tertiary base free from hydroxyl groups such, for example, as triethylamine. However, especially suitable are cyclic bases such, for example, as quinoline or acridine and above all pyridine bases such as pyridine itself and its closest homologues, for example, methyl pyridines or mixtures of pyridine bases such as the commercial $\beta{:}\gamma$-picoline mixture.

The relative proportions of the aluminum chloride and pyridine base must be so chosen that an easily stirrable melt is obtained at about 100° C. and is advantageously within the range of 1:1.6 to 1:2.

The carbazolization of the polyanthrimides is advantageously carried out at a temperature within the range of about 120–180° C. When a mixture of pyridine and aluminum chloride is used a temperature of 130–150° C. is especially advantageous, and the picolines, for example, enable the reaction to be carried out at higher temperatures up to about 180° C.

The reaction time is dependent on the proportion of aluminum chloride to teranthrimide monocarbazole. The greater the amount of aluminum chloride, the shorter the reaction time. If the proportion of aluminum chloride to tetranthrimide monocarbazole is at least 1:2, it requires in general less than an hour to complete the carbazolization.

The reaction mixture may be worked up in the usual manner, for example, by diluting it with water, then rendering the mixture alkaline with an alkali hydroxide, and treating it with sodium hypochlorite, or vatting the dyestuff so obtained by the addition of a suitable reducing agent, such as sodium hydrosulfite, and then precipitating the dyestuff by oxidation, for example, with air.

The so obtained dyestuffs can be used as pigments. However, they are especially suitable for dyeing or printing a very wide variety of fibers, especially cellulose-containing fibers such as cotton, linen, and artificial silk or staple fibers or regenerated cellulose. If desired, the new dyestuffs can be used in the form of their leuco ester salts, for example, sulfuric acid leuco esters salts, obtainable by known methods, for dyeing or printing by methods known for this type of dyestuff.

The following examples illustrate the invention, the parts and percentages being by weight unless otherwise stated and the relationship of parts by weight to parts by volume being the same as that of the kilogram to the liter:

Example 1

11.5 parts of 4,4′-diamino-1,1′-dianthrimide-2,2′-carbazole, 12.2 parts of 1-chloranthraquinone, 8 parts of sodium carbonate, 0.2 part of cuprious chloride and 150 parts of naphthalene are stirred for 8 hours at 210–212° C. The reaction mixture is then allowed to cool to 140° C., and is diluted with 200 parts of chlorobenzene. The mixture is filtered with suction while hot, and the filter residue is washed with chlorobenzene. In order to remove the solvent the filter residue is subjected to steam distillation, then acidified with hydrochloric acid, the mixture is filtered with suction, and the filter residue is washed neutral and dried. There is obtained a dark powder which dissolves in concentrated sulfuric acid with a brown coloration 60 parts of aluminum chloride are introduced slowly into 125 parts of pyridine, while stirring. When the addition is complete, there are introduced into the melt 30 parts of the 1,1′-4′,1″-4″,1‴-tetranthrimide-3′,2″-carbazole, as obtained in the first paragraph and the mixture is heated to 138–140° C. in the course of 45 minutes. At that temperature the mixture is further stirred for two hours. The melt is then poured on to 1000 parts of ice. To the resulting mixture are added 400 parts of sodium hydroxide solution of 35 percent strength and 200 parts of sodium hypochlorite solution containing 10–12 percent of active chlorine. The reaction mixture is then maintained at 90° C. for one hour while stirring energetically, then the mixture is filtered with suction, and the filter residue is washed until neutral. The residue is then stirred into water, then acidified with hydrochloric acid and the whole is boiled for a short time. The dyestuff is then filtered off with suction, washed neutral with water and dried. It is a dark powder which dissolves in concentrated sulfuric acid with a brown coloration and dyes cotton from a brown vat fast grey tints.

Example 2

60 parts of aluminum chloride are slowly introduced into 120 parts of pyridine, while stirring. When the addition is complete, there are added to the melt 15 parts of 1,1′-4′,1″-4″,1‴-tetranthrimide-3′,2″-carbazole, as obtained in the first paragraph of Example 1, and the temperature is raised to 139–141° C. in the course of 45 minutes. The mixture is further stirred at that temperature for 6 hours. The melt is then poured on to 1000 parts of ice. To the mixture are added 400 parts of sodium hydroxide solution of 35 percent strength and 200 parts of sodium hypochlorite solution containing 10–12 percent of active chlorine. The reaction mixture is then energetically stirred for one hour at 90° C., filtered with suction, and the filter residue is washed neutral and dried. The dyestuff is a dark powder which dissolves in concentrated sulfuric acid with a brown coloration and dyes cotton from a brown vat fast olive tints.

Example 3

9.2 parts of 4,4′-diamino-1,1′-dianthrimide-2,2′-carbazole, 16 parts of 1-chloro-4-benzoylaminoanthraquinone, 6 parts of sodium carbonate, 0.5 part of cuprous chloride and 300 parts of naphthalene are stirred for 15 hours at 210° C. The melt is then allowed to cool to 150° C., then diluted with 200 parts of chlorobenzene, and filtered with suction at 120° C. The filter residue is washed first with chlorobenzene and then with alcohol. The filter residue is then suspended in dilute hydrochloric acid, stirred at 80° C. for a short time, then filtered off with suction and washed neutral with water and dried. There is obtained a dark powder which dissolves in concentrated sulfuric acid with a brown coloration.

40 parts of aluminum chloride are introduced, while stirring, into 80 parts of pyridine. When the addition is complete, there are added to the melt 10 parts of 4,4‴-dibenzoylamino-1,1′-4′,1″-4″,1‴-tetranthrimide, 3′,2″-carbazole, as obtained in the first paragraph and the whole is heated to 139–141° C. in the course of 45 minutes. At that temperature the mixture is stirred for 4 hours. The melt is then poured on to 600 parts of ice. To the resulting mixture are added 300 parts of sodium hydroxide solution of 35 percent strength and 150 parts of sodium hydrochlorite solution containing 10–12 percent of active chlorine. The reaction mixture is then maintained at 90° C. for one hour while stirring, then filtered with suction, and the filter residue is washed neutral. The residue is then stirred in water, acidified with hydrochloric acid, and boiled for a short time. The dyestuff is filtered off with suction, washed neutral with water and dried. It is a dark powder which dissolves in concentrated sulfuric acid with a brown coloration and dyes cotton from a brown vat fast grey-olive tints.

Example 4

1.5 parts of the dyestuff obtainable as described in the second paragraph of Example 1 are vatted at about 50° C. in 150 parts of water with the addition of 3 parts of sodium hydrosulfite and 6 parts by volume of sodium hydroxide solution of 30 percent strength. The resulting stock vat is added to a dyebath of 2000 parts of water containing 4 parts by volume of sodium hydroxide solution of 30 percent strength and 2 parts of sodium hydrosulfite. 100 parts of cotton yarn are entered into the dyebath at 40° C., after ¼ hour 20 parts of sodium chloride are added, and dyeing is carried on for one hour at 40–50° C. The cotton is then squeezed, oxidized, rinsed in cold water, acidified, again rinsed and finally soaped at the boil for ½ hour. The yarn is dyed a fast grey tint.

What is claimed is:

1. A process for the manufacture of anthraquinone vat dyestuffs which comprises condensing one mol of a compound of the formula

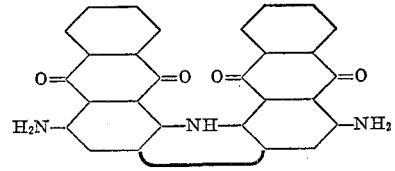

with two mols of a member selected from the group consisting of 1-chloroanthraquinone and 1-chloro-4-benzoylaminoanthraquinone and treating the so obtained tetranthrimide monocarbazole with aluminum chloride in the presence of a pyridine base.

2. A process for the manufacture of anthraquinone vat dyestuffs which comprises condensing one mol of a compound of the formula

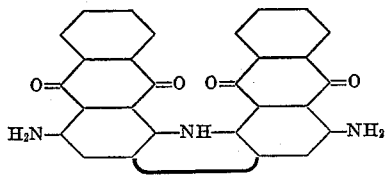

with two mols of a member selected from the group consisting of 1-chloroanthraquinone and 1-chloro-4-benzoylaminoanthraquinone and treating the so obtained tetranthrimide monocarbazole with at least one mole of aluminum chloride at a temperature ranging from 120–180° C. in the presence of a pyridine base.

3. A process for the manufacture of anthraquinone vat dyestuffs which comprise condensing one mol of a compound of the formula

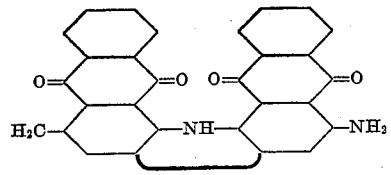

with two mols of 1-chloroanthraquinone and treating the so-obtained tetranthrimide monocarbazole with aluminum chloride in the presence of pyridine at a temperature ranging from 120–180° C.

4. A process for the manufacture of anthraquinone vat dyestuffs which comprises condensing one mol of a compound of the formula

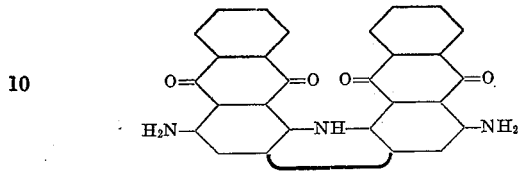

with two mols of 1-chloro-4-benzoylaminoanthraquinone and treating the so-obtained tetranthrimide monocarbazole with aluminum chloride in the presence of pyridine at a temperature ranging from 120–180° C.

References Cited in the file of this patent
UNITED STATES PATENTS

| | | |
|---|---|---|
| 1,690,306 | Mieg | Nov. 6, 1928 |
| 2,026,150 | Utzinger | Dec. 31, 1935 |
| 2,030,253 | Hauser | Feb. 11, 1936 |
| 2,385,113 | Smyth | Sept. 18, 1945 |
| 2,539,193 | Kern | Jan. 23, 1951 |
| 2,672,462 | Grelat | Mar. 16, 1954 |
| 2,702,294 | Grelat | Feb. 15, 1955 |

UNITED STATES PATENT OFFICE
CERTIFICATE OF CORRECTION

Patent No. 2,853,492                                         September 23, 1958

Maurice Grelat et al.

It is hereby certified that error appears in the printed specification of the above numbered patent requiring correction and that the said Letters Patent should read as corrected below.

Column 2, line 67, for "teranthrimide" read -- tetranthrimide --; column 3, line 30, for "cuprious" read -- cuprous --; column 4, line 10, for "henzoylaminoanthraquinone" read -- benzoylaminoanthraquinone --; line 25, for "-tetranthrimide," read -- -tetranthrimide- --; column 5, line 25, extreme left-hand portion of formula, for "$H_2C$--" read -- $H_2N$-- --.

Signed and sealed this 16th day of June 1959.

(SEAL)
Attest:

KARL H. AXLINE                                                           ROBERT C. WATSON
Attesting Officer                                                     Commissioner of Patents